March 28, 1939. E. R. PRICE ET AL 2,152,088

CLUTCH CONTROL MECHANISM

Filed Sept. 26, 1935 4 Sheets-Sheet 1

INVENTOR.
EARL R. PRICE
HAROLD W. PRICE
BY
ATTORNEY

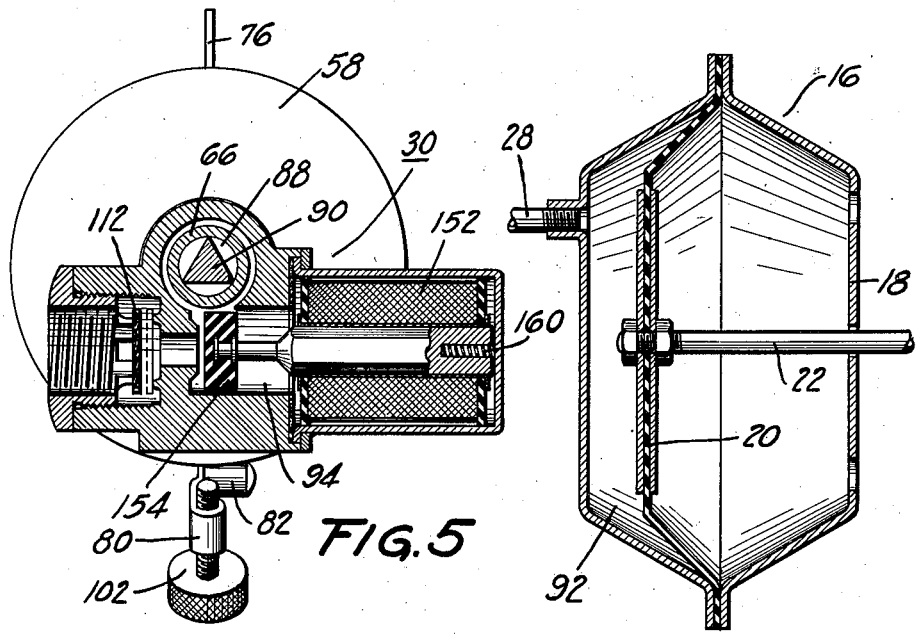
FIG. 5
FIG. 7
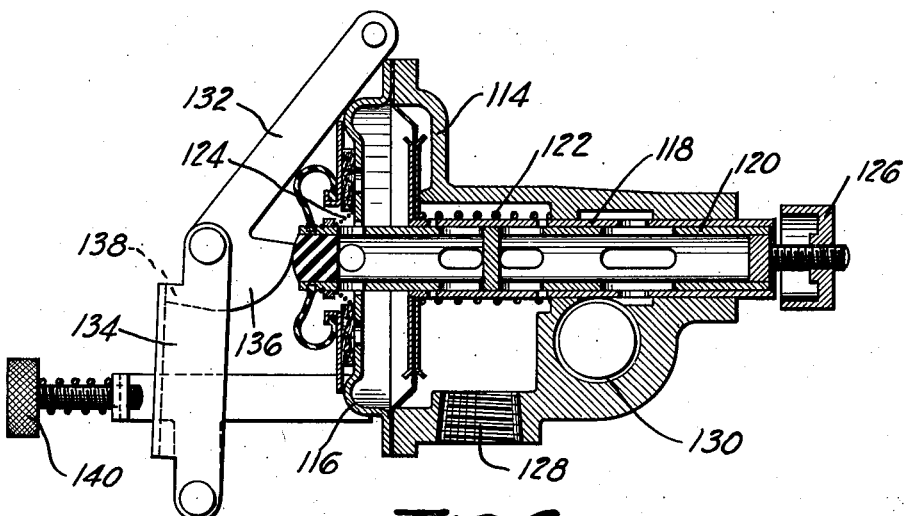
FIG. 6
INVENTOR.
EARL R. PRICE
HAROLD W. PRICE
BY H. O. Clayton
ATTORNEY

INVENTOR.
EARL R. PRICE
HAROLD W. PRICE
BY
ATTORNEY

Patented Mar. 28, 1939

2,152,088

UNITED STATES PATENT OFFICE 2,152,088

CLUTCH CONTROL MECHANISM

Earl R. Price and Harold W. Price, South Bend, Ind., assignors to Bendix Products Corporation, South Bend, Ind., a corporation of Indiana Application September 26, 1935, Serial No. 42,201

6 Claims. (Cl. 192—.01)

This invention relates to automotive clutch control mechanism, and more particularly to an accelerator controlled power mechanism for operating the clutch in such fashion as to closely simulate a skillful manual operation thereof.

Heretofore in the development of this art the mechanism was designed to automatically disengage the clutch upon release of the accelerator and upon depression of the accelerator to initiate a two-stage engagement of the clutch, the rate of clutch movement during the second stage depending upon the position of the accelerator. However, such mechanism, in a measure, proves unsatisfactory, inasmuch as the engagement of the clutch is automatically completed with each and every throttle-open position of the accelerator, no means being provided for a so-called maneuvering control of the clutch in coordination with the opening of the throttle. This latter operation of the throttle and clutch is that which is effected in a conventional operation of an automotive vehicle. The accelerator is alternately depressed and released by the right foot of the driver as the clutch pedal is depressed and released by the left foot, the two being coordinated in such fashion as either to move forward or to back up the vehicle in accordance with torque requirements, that is, smoothly and with the least wear and tear on both the engine and the clutch.

This invention is accordingly directed to a clutch operating power mechanism wherein the clutch engagement control, that is the control of the clutch plate loading pressures, is so correlated with the degree of throttle opening as to closely simulate a conventional manual operation of the throttle and clutch. To this end there is provided a clutch operating pressure differential operated motor, the control valve thereof being of the pressure balanced follow-up type and operated by the accelerator. For a given position of the accelerator there is thus effected a corresponding position of the clutch to control both the engagement and the disengagement thereof.

A further object of the invention is to provide means for so controlling the aforementioned power means as to limit the clutch plate loading pressure to a predetermined maximum, thus obviating any undesirable jerking of the vehicle.

A further object of the invention is to incorporate a check valve in the connection between the source of power, preferably the intake manifold, and the differential pressure motor, thus providing an additional means for limiting the clutch plate loading pressure to a predetermined maximum.

Yet another object of the invention is to provide power means, controlled in part by the accelerator, operative to permit the clutch to move relatively rapidly, under the action of the clutch springs, up to the cushioning point in the engagement of the clutch and to thereafter move either continuously or intermittently, depending upon the mode of operation of the accelerator.

Yet another object of the invention is to provide power means, controlled by both the transmission and by either a circuit breaker or by the brake pedal, said power means being operative, when the transmission is in high gear, to cut out the clutch operating power means, unless and until the brake is applied or the engine speed drops to a predetermined minimum, whereupon the power means automatically again becomes operative to disengage the clutch.

A further object of the invention is to provide a valve mechanism operative for accomplishing the desired results above referred to and wherein the mechanism is extremely simple in construction and economical to manufacture in view of the relatively few parts and few adjustments of those parts.

Other objects of the invention and desirable details of construction and combinations of parts will become apparent from a detailed description of certain embodiments of the invention, described in detail in the following specification, taken in conjunction with the accompanying drawings illustrating said embodiments, in which:

Figure 5 is a transverse sectional view of the valve mechanism, taken on the line 5—5 of Figure 2;

Figure 6 is a longitudinal sectional view of a modified form of valve mechanism;

Figure 7 is a sectional view of the pressure differential operated clutch motor;

Figure 1:
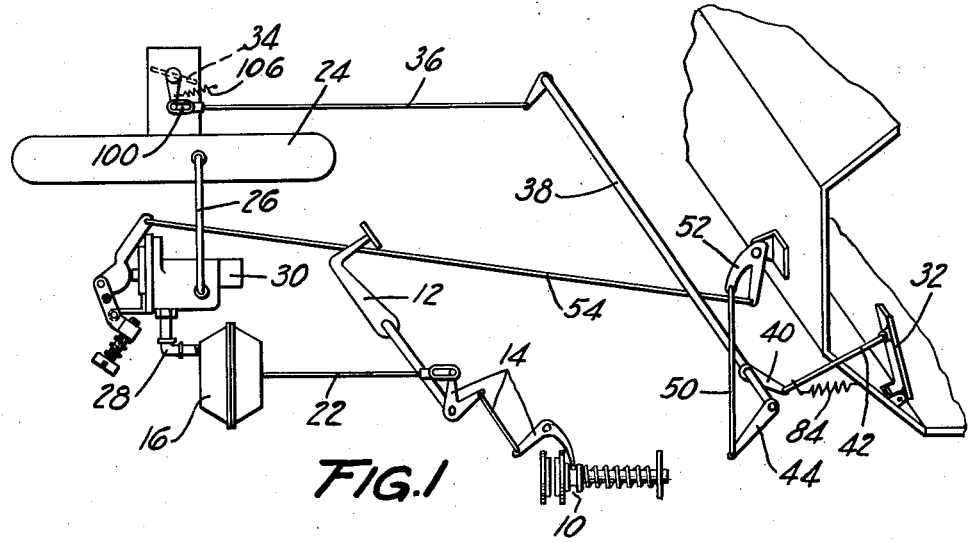
Figure 1 is a diagrammatic view of the preferred form of clutch control mechanism constituting our invention.

Referring to the clutch mechanism of Figure 1, a conventional clutch 10 of the friction disc type is adapted to be operated either manually by a clutch pedal 12 and linkage 14 or by power through the medium of a pressure differential motor 16, Figure 7, comprising a cylinder 18 and diaphragm 20, the latter being connected to the clutch by a link 22 and the aforementioned linkage 14. The motor 16 is placed in fluid transmitting connection with an intake manifold 24 by means of conduits 26 and 28, the two being interconnected by a control valve unit 30. An accelerator 32 is operatively connected to a butterfly valve 34 of a throttle mechanism by a link 36, cross shaft 38, crank 40 and link 42 and to the valvular unit 30 by link 42, cranks 40 and 44, link 50, bell crank 52 and link 54.

Referring now to the valve unit 30, the same comprises a casing including sections 56 and 58 fixedly secured to the engine, preferably adjacent the intake manifold and the clutch motor, as disclosed in Figure 1. Sections 56 and 58 retain between them a flexible diaphragm 60 fixedly secured at its center, by fastenings 62 and 64, to a sleeve valve member 66 provided with an annular series of ports 68 and a second annular series of ports 70. The valve member 66 is urged to the left by a spring 72. A valve plunger member 74, slidably mounted within the sleeve valve 66, is urged into engagement with a valve operating cam lever member 76 by a spring 78, said lever member being pivotally connected at one end to the accelerator operated link 54 and at its other end to a lever 80 pivoted intermediate its ends to a bracket 82 secured to the valve casing.

Figure 2:
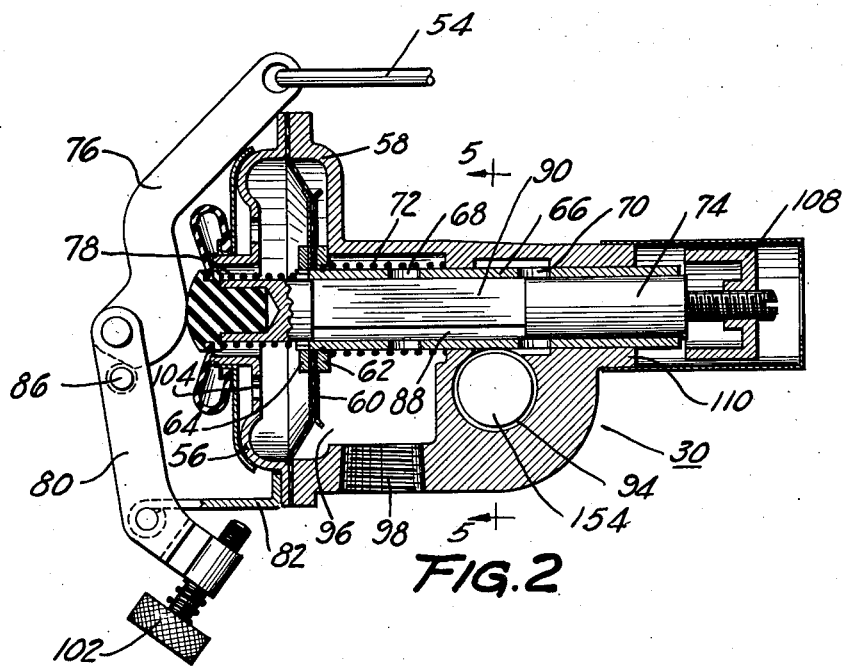
Figure 2 is a sectional view of the control valve mechanism of Figure 1, the valve parts being shown in their clutch disengaged position.

Describing now the operation of the aforementioned mechanism, upon release of the accelerator 32, an accelerator return spring 84 acts to force the cam lever 76 against a stop 86 and then move both levers 76 and 80 as a unit to force the valve plunger 74 to the position disclosed in Figure 2. In this position a recess 88, provided by virtue of a triangular-shaped body portion 90 of the valve plunger 74, registers with one of the ports 70 in the sleeve valve 66 and thereby interconnects a suction compartment 92 of the clutch motor 16 to the manifold via conduit 26, a duct 94 in the valve casing, port 70, recess 88, port 68, a compartment 96 in the valve casing, a port 98, and conduit 28.

The engine, now idling by virtue of the closed throttle, induces a vacuum in the intake manifold and the clutch motor compartment 92 is accordingly partially evacuated to thereby energize the clutch motor and disengage the clutch.

Figure 3:
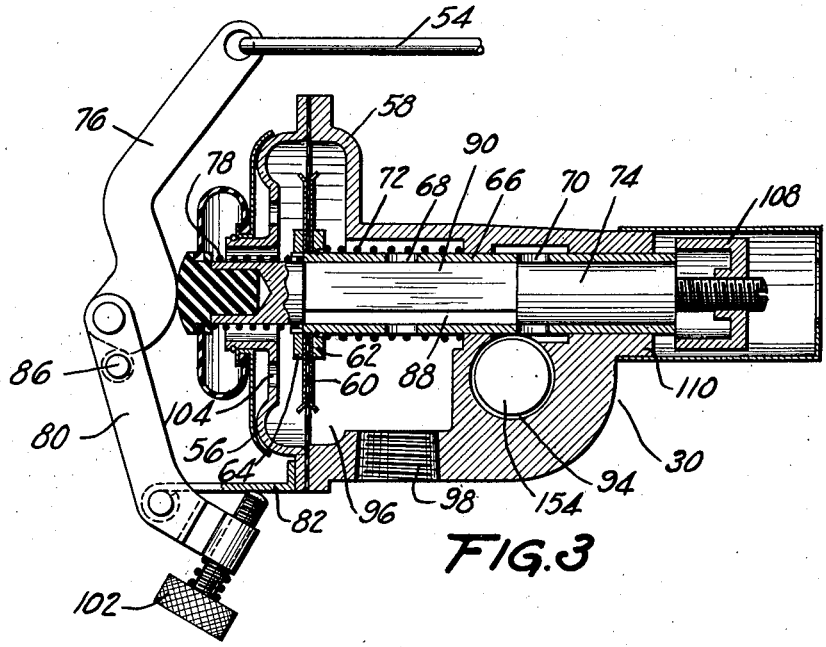
Figure 3 is a sectional view of the valve mechanism, the valve parts being in their lapped position to maintain the clutch at the so-called cushion point.
Figure 4:
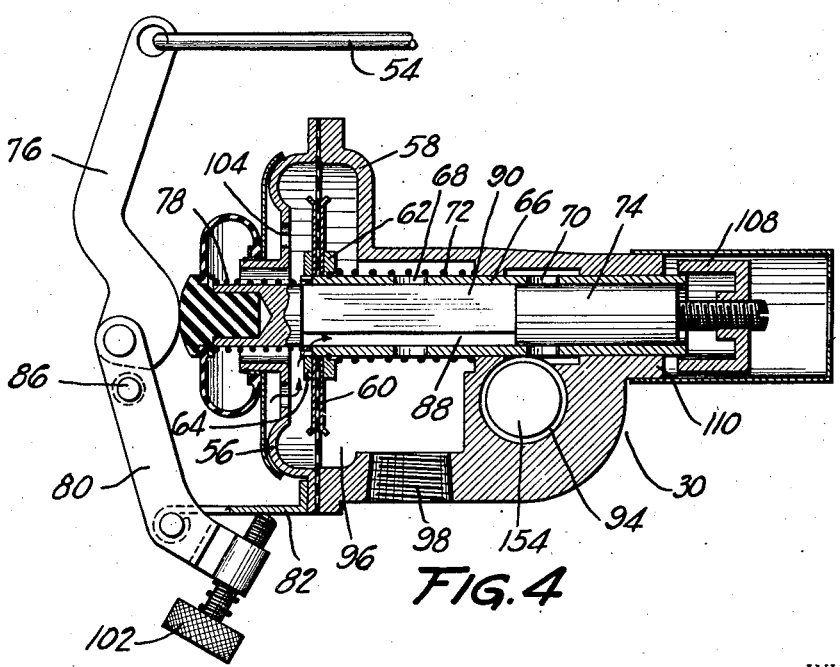
Figure 4 is another sectional view of the valve mechanism, the parts being in the so-called cracked position to initiate a further engagement of the clutch.

The transmission may now be operated to select the desired gear ratio, whereupon it is necessary to reengage the clutch. This is effected by depressing the accelerator until the lost motion at a slot 100, Figure 1, is taken up. The accelerator being in this position, the valve spring 78, which is weaker than the accelerator return spring 84, is operative to move the plunger 74 and levers 76 and 80 to the position disclosed in Figure 3. In this position an adjustable stop 102 secured to the lever 80 contacts the bracket 82. In this operation the plunger 74 is moved relative to the sleeve valve 66 to first cut off the communication between the recess 88 and the slot 70, Figure 2, and subsequently move the plunger relative to the sleeve valve to the relative position of the valve parts disclosed in Figure 4. Air is then admitted to the chamber 92 of the motor, as in part disclosed by the arrows in Figure 4, the air entering via ports 104 in the valve section 56, recess 88, ports 68, valve chamber 96, port 98, and conduit 28. The plunger 74 being held in the aforementioned position, the sleeve valve 66 then moves to the left, as the gaseous pressure in the chamber 96 is increased. This movement is terminated when the valve is said to be lapped, which is the position of the valve parts disclosed in Figure 3, connection between both the atmosphere and manifold to the clutch motor being cut off.

The vacuum within the motor chamber 92 at this time is just sufficient to maintain the clutch plates in non-driving position. Thus with the accelerator moved to the cushion point, that is with the stop 102 abutting the bracket 82, the driving clutch plate is automatically moved just to the aforementioned position and no further. The stop 102 is adjusted from time to time for clutch plate wear.

Further opening movement of the accelerator is met by the resistance of a butterfly valve return spring 106, thus apprising the driver that the throttle is about to be opened and the clutch engaged. Such movement merely repeats the above described cycle of valve operations, that is a recracking of the valve to admit additional atmosphere to the chambers 96 and 92 and a subsequent follow-up action of the sleeve valve 66 to lap the valve and hold the clutch engaged at a given loading.

Thus the degree of clutch plate loading is determined by the degree of depression of the accelerator, the throttle at the same time being opened to a greater degree to increase the engine torque. The face of the cam of lever 76 may be contoured to effect any desired relative throttle opening and clutch engagement.

Should the driver wish to slightly release the clutch, as might be desired in maneuvering the vehicle into a parked position, he has merely to slightly release the accelerator, whereupon the reverse cycle of valve operations takes place and the clutch is released. The clutch, therefore, may be slipped in a given position as long as desired.

Should a greater degree of throttle opening be desired for a given clutch plate loading, such may be accomplished by more or less quickly depressing the accelerator, whereupon the throttle is opened to increase the R. P. M. of the engine prior to effecting the clutch plate loading for the given position of the throttle. Such an action results in part by virtue of the time lag in the operation of the power mechanism.

It is desirable to limit the degree of clutch plate loading in order to obviate a grabbing clutch, and to this end there is provided a stop mechanism comprising a nut 108 adjustably mounted on the end of the valve plunger 74 and contactible with the end wall of the valve casing at 110. Thus by adjusting the position of the nut 108 the driver may predetermine the limiting position of the valve plunger 74 and thus predetermine the maximum clutch plate loading. As an additional means for limiting the clutch plate loading, there is provided a check valve 112, Figure 5. Normally the check valve is seated as disclosed in the figure: however, should the gaseous pressure of the manifold exceed the gaseous pressures of the chambers 92 and 96, the valve automatically moves to the dotted line position disclosed in Figure 5, thus cutting off communication between said chambers and the manifold. This action may occur should the driver suddenly tramp upon the accelerator to open the throttle wide and reduce the pressure of the manifold to that of the atmosphere, or substantially so.

There is disclosed in Figure 6 a modified form of valve mechanism wherein a casing, comprising parts 114 and 116, houses telescoping sleeve valve members 118 and 120, the substantially elliptically shaped parts 118' and 120' of which are so arranged and proportioned as to provide a follow-up valve mechanism of the type previously described. Valve springs 122 and 124 serve to actuate the valve members, and a stop member 126 functions to limit the clutch engaging operation of the valve as previously described. The valve casing is ported at 128 and 130 to provide connections with the clutch motor and intake manifold respectively. The valve operating mechanism of Figure 6 comprises pivotally connected levers 132 and 134, the latter being U-shaped and the former having a cam portion 136 contoured to effect the desired relative throttle opening and clutch plate loading. In the clutch engaging movement of the levers, the two move as a unit by virtue of the action of the accelerator return spring and the valve spring 124, a stop 138 on the lever 132 abutting the bottom of the U-shaped lever 134. The latter contacts an adjustable stop 140 when the lost motion in the throttle operating link has been taken up, all as previously described. In all other respects the valve mechanism of Figure 6 functions in a manner similar to the mechanism of Figures 2, 3 and 4.

It is desirable to cut out the power operation of the clutch when the transmission is in high gear, thus eliminating the evils of free-wheeling and also obviating unnecessary wear of the clutch mechanism including the throw-out bearing thereof. It is, however, desirable to automatically again cut in the operation of the power means and thus automatically disengage the clutch in the event that the wheel brakes are applied, or the speed of the vehicle or engine is substantially reduced; otherwise, the engine would be stalled as the car is brought to a stop.

Figure 8:
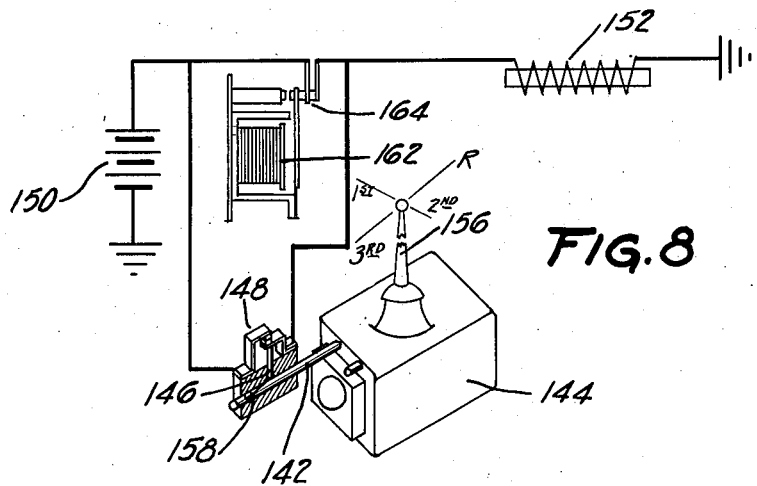
Figure 8 is a diagrammatic view of a combined high gear lock-out and circuit breaker cut-in hookup for the clutch control mechanism of Figure 1.
Figure 9:
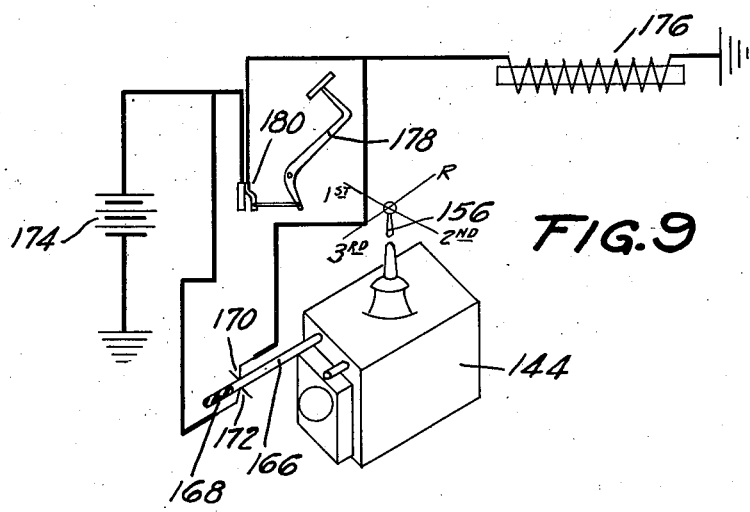
Figure 9 is a diagrammatic view of a hookup similar to that of Figure 8 with the exception that a brake pedal operated clutch control cut-in switch is substituted for the circuit breaker operated switch of Figure 8.

In Figures 8 and 9 there are disclosed mechanisms for accomplishing the above described results. Referring to Figure 8, the high and second gear shift rail 142 of a standard three-speeds forward and reverse transmission 144 is at all times in sliding contact with a pin 146 of a switch mechanism 148. The switch 148 serves to either make or break a circuit from a battery 150 to a solenoid 152, the latter functioning to operate a cut-out valve 154, Figure 5. When a gear shift lever 156 is moved to its high gear position, the rail 142 is moved to seat the pin 146 within a notch 158 in the rail, thus automatically breaking the switch 148 to deenergize the solenoid 152 and permit a spring 160, Figure 5, to seat the valve. The clutch motor is thus rendered inoperative, the motor being cut off from the manifold as a source of power. Subsequent release movements of the accelerator do not then disengage the clutch, thus obviating a free-wheeling effect and utilizing the engine as a brake when traveling in high gear. However, should the transmission be left in high gear and the engine speed dropped sufficiently to operate a conventional generator cut-out 162, a switch 164 is then closed, the switch 148 being shunted, the solenoid 152 again energized and the valve 154 opened to effect a disengagement of the clutch. A stalling of the engine is thus obviated. The clutch, however, is again automatically engaged when the engine speed is increased to operate the generator cut-out and break the switch 164. In order to increase the engine speed, the accelerator of course is depressed, thus again opening the valve to interconnect the motor 16 with the atmosphere. It should also be noted that in all selective positions of the transmission, except high gear, the switch 148 is maintained closed to thus open the valve 154 and render the clutch operating power means operative.

The mechanism of Figure 9 functions similarly to that of Figure 8, a brake pedal operated switch being substituted for the generator cut-out mechanism of Figure 8. In this embodiment of the invention, with the transmission in high gear, the high and second gear shift rail 166 is moved to register an insulated section 168 with switch contacts 170 and 172, thus breaking the circuit between a battery 174 and a cut-out valve operating solenoid 176. However, upon depressing a brake pedal 178, a switch 180 is closed to shunt the aforementioned contacts and again energize the solenoid 176 to open the cut-out valve. Thus the transmission may be left in high gear and the clutch is automatically disengaged in bringing the vehicle to a stop.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In a clutch operating mechanism for an automotive vehicle provided with a clutch, a throttle valve and an accelerator, a pressure differential operated power device connected with the clutch, pressure sensitive valvular means for controlling the operation of said power device, linkage having a lost motion connection therein interconnecting said throttle valve and valvular means, said linkage further including a leverage-changing means, said valvular means including a plurality of telescoping members operative upon movement of the accelerator to idling position to render the power device operative to disengage the clutch and operative upon movement of the accelerator toward open position for successively releasing the clutch elements for movement toward operative engagement, said valve operation further effecting an arresting of the movement of the clutch elements at a point prior to operative engagement, and then further releasing the clutch elements for movement into operative engagement.

2. In a clutch operating mechanism for an automotive vehicle provided with a clutch, a throttle valve and an accelerator, a pressure differential operated power device connected with the clutch, valvular means for controlling the operation of said power device, linkage having a lost motion connection therein interconnecting said throttle valve and valvular means, said linkage further including leverage-changing means, said valvular means including a plurality of telescoping members operative upon movement of the accelerator to idling position for rendering the power device operative to disengage the clutch and operative upon movement of the accelerator toward open position for successively releasing the clutch elements for movement toward operative engagement, said valve operation further effecting an arresting movement of the clutch elements at a point prior to operative engagement, and then further releasing the clutch elements for movement into operative engagement, said valvular means further including a stop member to limit the clutch engaging operation thereof.

3. In a clutch operating mechanism for an automotive vehicle provided with a clutch, a throttle valve and an accelerator, a pressure differential operated power device connected with the clutch, valvular means for controlling the operation of said power device, linkage having a lost motion connection therein interconnecting said throttle valve and valvular means, said linkage further including a leverage-changing means, said valvular means including a plurality of telescoping members operative upon movement of the accelerator to idling position for rendering the power device operative to disengage the clutch and operative upon movement of the accelerator toward open position for successively releasing the clutch elements for movement toward operative engagement, said valve operation further effecting an arresting movement of the clutch elements at a point prior to operative engagement, and then further releasing the clutch elements for movement into operative engagement, said valvular means further including a stop member to limit the clutch engaging operation thereof, and a check valve mechanism also operative to limit the clutch engaging operation of the valve mechanism.

4. In a clutch operating mechanism for an automotive vehicle provided with a change-speed transmission, on engine, a clutch, a throttle valve and an accelerator, a pressure differential operated power device connected with the clutch, pressure sensitive valvular means for controlling the operation of said power device, linkage having a lost motion connection therein interconnecting said throttle valve and valvular means, said linkage further including a leverage-changing means, said valvular means including a plurality of telescoping members operative upon movement of the accelerator to idling position to render the power device operative to disengage the clutch and operative upon movement of the accelerator toward open position for successively releasing the clutch elements for movement toward operative engagement, said valve operation effecting an arresting of the movement of the clutch elements at a point prior to operative engagement, and then further releasing the clutch elements for movement into operative engagement, together with power operated means operative to cut the power device out of operation, when and if the change-speed transmission of the vehicle is in high gear and the speed of the engine exceeds a predetermined factor.

5. In a clutch operating mechanism for an automotive vehicle provided with a change-speed transmission, an engine, a wheel brake, a clutch, a throttle valve and an accelerator, a pressure differential operated power device connected with the clutch, pressure sensitive valvular means for controlling the operation of said power device, linkage having a lost motion connection therein interconnecting said throttle valve, accelerator and valvular means, said linkage further including a leverage-changing means, said valvular means including a plurality of telescoping members operative upon movement of the accelerator to idling position to render the power device operative to disengage the clutch and operative upon movement of the accelerator toward open position for successively releasing the clutch elements for movement toward operative engagement, said valve operation effecting an arresting of the movement of the clutch elements at a point prior to operative engagement, and then further releasing the clutch elements for movement into operative engagement, together with power operated means operative to cut the power device out of operation, when and if the change-speed transmission of the vehicle is in high gear and the wheel brake is released.

6. The combination with a clutch, a throttle and an accelerator of a motor vehicle, of a pressure differential operated motor operably connected with the clutch, valve means including relatively movable telescoping valve members for controlling the operation of said motor, valve and throttle operating means interconnecting said accelerator, throttle and valve means including a lost motion connection, and further including leverage-changing means and a stop, said valve being operative upon movement of the accelerator to idling position for rendering the motor operative to disengage the clutch and operative upon movement of the accelerator toward open position for intermittently releasing the clutch elements for movement toward operative engagement, said intermittent movement of the valve including, by virtue of the aforementioned stop and leverage-changing means, an arresting of the movement of the clutch elements at a point prior to operative engagement, and then further releasing the clutch elements for movement into operative engagement by successive stages.

HAROLD W. PRICE.
EARL R. PRICE.

CERTIFICATE OF CORRECTION.

Patent No. 2,152,088.             March 28, 1939.

EARL R. PRICE, ET AL.

It is hereby certified that error appears in the printed specification of the above numbered patent requiring correction as follows: Page 3, first column, line 15, for the word "parts" read ports; page 4, first column, line 40, claim 4, for "on" before "engine" read an; and that the said Letters Patent should be read with this correction therein that the same may conform to the record of the case in the Patent Office.

Signed and sealed this 13th day of February, A. D. 1940.

(Seal)                                        Henry Van Arsdale,
                                               Acting Commissioner of Patents.